(12) United States Patent
Celasun et al.

(10) Patent No.: US 11,618,076 B2
(45) Date of Patent: Apr. 4, 2023

(54) SYNTHESIS METHOD

(71) Applicant: COMMISSARIAT A L'ENERGIE ATOMIQUE ET AUX ENERGIES ALTERNATIVES, Paris (FR)

(72) Inventors: Yagmur Celasun, Grenoble (FR); Jean-Francois Colin, Grenoble (FR); Sebastien Martinet, Grenoble (FR); David Peralta, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 734 days.

(21) Appl. No.: 16/575,443

(22) Filed: Sep. 19, 2019

(65) Prior Publication Data

US 2020/0086389 A1 Mar. 19, 2020

(30) Foreign Application Priority Data

Sep. 19, 2018 (FR) ...................... 1858476

(51) Int. Cl.
| | |
|---|---|
| *B22F 9/04* | (2006.01) |
| *H01M 4/136* | (2010.01) |
| *H01M 4/40* | (2006.01) |
| *H01M 10/0525* | (2010.01) |

(52) U.S. Cl.
CPC .............. *B22F 9/04* (2013.01); *H01M 4/136* (2013.01); *H01M 4/405* (2013.01);
(Continued)

(58) Field of Classification Search
CPC .................. B22F 9/04; B22F 2009/042; B22F 2009/043; B22F 2301/205; H01M 4/136;
(Continued)

(56) References Cited

U.S. PATENT DOCUMENTS

2016/0190638 A1* 6/2016 Sugiura ............. H01M 10/0562
429/189
2016/0285097 A1 9/2016 Sakuda et al.
(Continued)

FOREIGN PATENT DOCUMENTS

EP 2 977 354 A1 1/2016

OTHER PUBLICATIONS

U.S. Appl. No. 16/575,443, filed Sep. 19, 2019, Yagmur Celasun, et al.
(Continued)

*Primary Examiner* — Anthony M Liang
*Assistant Examiner* — Danny N Kang
(74) *Attorney, Agent, or Firm* — Oblon, McClelland, Maier & Neustadt, L.L.P.

(57) ABSTRACT

A process for synthesizing a material, includes:
(a) providing a plurality of powders including at least one lithiated powder including lithium, at least one TM powder including, for more than 95.0% of its mass, a transition metal chosen from titanium; cobalt, manganese, nickel, niobium, tin, iron and mixtures thereof, and at least one chalcogen powder including, for more than 95.0% of its mass, a chalcogen element chosen from sulfur, selenium, tellurium and mixtures thereof,
(b) preparing a particulate mixture by mixing all the powders of the plurality or by mixing one of the powders of the plurality with a milled material obtained by; milling a particulate assembly formed by mixing at least two of the other powders of the plurality, and
(c) milling the particulate fixture to form the material.

16 Claims, 1 Drawing Sheet

Figure 1:
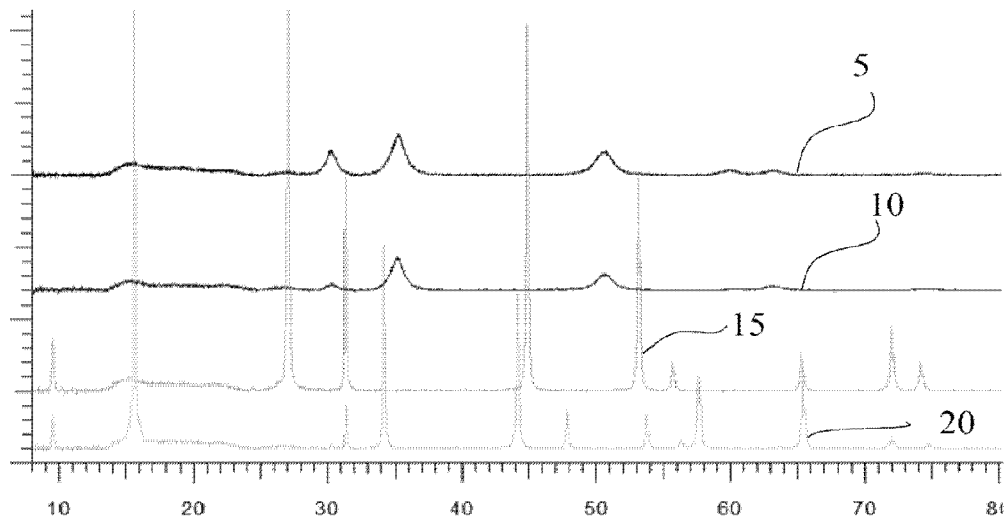

(52) U.S. Cl.
CPC ... *H01M 10/0525* (2013.01); *B22F 2009/042* (2013.01); *B22F 2009/043* (2013.01); *B22F 2301/205* (2013.01)

(58) Field of Classification Search
CPC .. H01M 4/405; H01M 10/0525; H01M 4/581; H01M 4/5815; Y02E 60/10; C01G 49/009; C01G 53/006; C01G 23/002; C01G 19/006; C01G 33/006; C01G 45/006; C01G 51/006; C01B 19/007
See application file for complete search history.

(56) References Cited

U.S. PATENT DOCUMENTS

| | | |
|---|---|---|
| 2016/0030821 A1 | 10/2016 | Sakuda et al. |
| 2017/0256798 A1* | 9/2017 | Christensen .......... H01M 4/366 |

OTHER PUBLICATIONS

U.S. Appl. No. 16/575,436, filed Sep. 19, 2019, Yagmur Celasun, et al.

French Preliminary Search Report dated May 20, 2019 in French Application 18 58476, filed on Sep. 19, 2018 (with English Translation of categories of Cited Documents & Written Opinion).

Zhang, Z. et al. "Sealed-tube synthesis and phase diagram of $Li_2TiS_2(0<x<1)$", Materials Research Bulletin 61, 2015, pp. 499-503.

Yamamoto, T. et al. "Lithium Secondary Battery Using Monoclinic NbS3 prepared under High Pressure", Journal of the Electrochemical Society, Electrochemical Society, vol. 133, No. 8, 1986, pp. 1558-1561.

* cited by examiner

SYNTHESIS METHOD

The present invention relates to a process for synthesizing a material intended to at least partially constitute a battery cathode.

Cathodes based on a chalcogen element such as sulfur, tellurium and selenium have great potential for lithium-ion battery applications. In particular, lithium titanium sulfide, of formula $Li_2TiS_3$, known notably from EP 2 977 354 A1 and from the article A. Sakuda et al., "*Rock-salt-type lithium metal sulphide as novel positive-electrode materials*", Sci. Rep., vol. 4, 4883 (2014). It has high reversible capacity, greater than 250 mAh/g and which may be up to 400 mAh/g by means of multi-electron redox reactions.

The article from Sakuda et al. describes a process for synthesizing lithium titanium sulfide, in which a particulate mixture, formed from a powder of lithium sulfide $Li_2S$ and of titanium sulfide $TiS_2$, is milled under a neutral atmosphere of argon by means of a planetary ball mill. The energy provided by the milling is sufficient for the titanium sulfide to react with the lithium sulfide to form lithium titanium sulfide according to the reaction scheme $Li_2S + TiS_2 \rightarrow Li_2TiS_3$. The lithium ions Li of the lithium titanium sulfide described originate from the precursor lithium sulfide $Li_2S$ and the titanium ions $Ti^{4+}$ originate from the precursor titanium sulfide $TiS_2$ and the sulfur ions $S^{2-}$ originate from the precursors lithium sulfide $Li_2S$ and titanium sulfide $TiS_2$.

The process described in Sakuda et al. is easy to perform. The synthesis of the material is also relatively rapid.

However, in general, the result of a synthesis by milling the salts depends on the morphology and size of the particles of the salts.

For example, titanium sulfide is a salt whose synthesis is expensive and difficult to control. The variety of the morphologies and sizes of titanium sulfide powders commercially available is low.

The possibilities for performing a synthetic process of Sakuda et al. are thus limited.

There is thus a need for a synthetic process which overcomes this drawback.

The invention intends to meet this need, and proposes a process for synthesizing a material, the process including the steps consisting in:
a) providing a plurality of powders including:
at least one powder including lithium, referred to as "lithiated powder",
at least one powder including, for more than 95.0% of its mass, a transition metal chosen from titanium, cobalt, manganese, nickel, niobium, tin, iron and mixtures thereof, referred to as "TM powder", and
at least one powder including, for more than 95.0% of its mass, a chalcogen element chosen from sulfur, selenium, tellurium and mixtures thereof, referred to as "chalcogen powder",
b) preparing a particulate mixture by mixing all the powders of the plurality or by mixing one of the powders of the plurality with a milled material obtained by milling a particulate assembly formed by mixing at least two of the other powders of the plurality, and
c) milling the particulate mixture to form the material.

Contrary to all expectation, the inventors succeeded in synthesizing, by means of the process according to the invention, a material with a crystalline nature and electrochemical properties substantially identical to those of the product obtained from a process involving milling of particles of a lithiated salt and particles of a salt formed from the chalcogen element and from the transition metal, as described, for example, in Sakuda et al.

This proved to be particularly surprising for the following reasons.

The transition metal, finely divided in powder form, can readily become oxidized. For example, titanium is readily oxidized and may even be flammable on contact with air when the size of the particles becomes nanometric. A material having such characteristics is generally overlooked, since it can prevent the achievement of the desired synthesis. In addition, the oxidation state and the reactivity of the species used during a synthesis are known to be predominant parameters, influencing the chemical and crystallographic nature of the material synthesized. In the TM powder and in the chalcogen powder, the respective oxidation states of the transition metal and of the chalcogen element are different from their states when they form a salt. For example, in a titanium powder and in a sulfur powder, titanium and sulfur each have an oxidation state 0, whereas in a titanium sulfide salt, the titanium has an oxidation state +4 and the sulfur has an oxidation state −2. Moreover, the transition metal and the chalcogen element, each in a different powder, do not have the same reactivity towards other chemical species, notably lithium, as when they form a salt.

Moreover, the process according to the invention is particularly versatile. Specifically, the particle size and the form of the particles of the TM powders can be more readily modified than those of a powder of a salt formed from the chalcogen element and from the transition metal. Notably, commercial catalogues propose a wider variety of TM powders and of chalcogen powders than of powders of particles of such a salt.

In addition, the process according to the invention makes it possible, via reactions between the chalcogen element, the transition metal and lithium, to synthesize materials for which a process based on salts as described in Sakuda et al. cannot be used. This is the case, for example, for manufacturing a material including lithium, selenium and titanium. No salt consisting of selenium and titanium is known, according to the inventors.

Finally, the process according to the invention is readily performed by means of a conventional mill, provided that the mill supplies a milling energy sufficient for the reaction of the constituents of the powders of the plurality to be able to take place. A person skilled in the art readily knows how to select such a mill.

Preferably, the amounts of lithiated powder, of TM powder and of chalcogen powder are determined so that, at the end of the milling step c), the material has the formula (I)

$$Li_xM_yA_z,$$

with M being a transition metal chosen from titanium, manganese, cobalt, nickel, niobium, tin, iron and mixtures thereof, A being a chalcogen element chosen from sulfur, tellurium, selenium and mixtures thereof, the stoichiometric coefficients x, y and z being such that
$1.0 < x < 4.0$;
$0 < y \leq 2.0$; and
$1.0 \leq z \leq 4.0$.

Determination of the suitable amounts of lithiated powder, TM powder and chalcogen powder is a routine task for a person skilled in the art. The transition metal M may be chosen from titanium, manganese, cobalt and mixtures thereof.

Preferably, the stoichiometric coefficient x of lithium is less than 3.1, preferably less than or equal to 3.0 and/or greater than 1.9. In particular, the stoichiometric coefficient x may be equal to 2.0.

Preferably, the stoichiometric coefficient y of the transition metal is less than 1.5, preferably less than or equal to 1.1, for example less than or equal to 1.0, and/or greater than 0.5, preferably greater than 0.8, preferably greater than or equal to 0.9. In particular, the stoichiometric coefficient x may be equal to 1.0.

Preferably, the stoichiometric coefficient z of the chalcogen element is less than 3.5 and/or greater than 1, preferably greater than 2.0. In particular, the stoichiometric coefficient x may be equal to 3.0.

In step a), at least one lithiated powder, one TM powder and one chalcogen powder are provided.

The lithiated powder may include, for more than 90.0% of its mass, preferably more than 95.0% of its mass, or even more than 99.0% of its mass, or even more than 99.9% of its mass, lithium.

According to a preferred variant, the lithiated powder includes lithium and, for less than 90% of its mass, the chalcogen element. Preferably, the lithiated powder includes, for more than 90.0% of its mass, particles formed from lithium and from the chalcogen element. Preferably, the powder includes particles of a lithium salt including the chalcogen element.

Preferably, the powder includes, preferably for more than 90.0% of its mass, preferably more than 95.0% of its mass, or even more than 99.0% of its mass, or even more than 99.9% of its mass, the lithium salt.

In particular, in a variant in which the synthesis of a material of formula $Li_xM_yS_z$ is targeted, the lithium salt may be lithium sulfide $Li_2S$.

Preferably, the TM powder includes, for more than 99.0% of its mass, preferably for more than 99.9% of its mass, the transition metal. It may consist of the transition metal.

Preferably, the TM powder is formed, for more than 90.0% of its mass, preferably more than 95.0% of its mass, preferably for more than 99.0% of its mass, preferably for more than 99.9% of its mass, particles formed from the transition metal.

The transition metal may be titanium or manganese or cobalt or nickel or niobium or tin or iron.

Preferably, the transition metal is titanium, and preferably the material obtained at the end of step c) then has the formula $Li_xTi_yA_z$.

In one variant, the plurality of powders includes at least two TM powders that are different from each other, which may differ in their particle sizes and or, preferably, in their compositions.

In particular, the plurality of powders may include first and second TM powders that are different from each other, notably at least in their compositions.

Preferably, the transition metal of the first TM powder is titanium and the transition metal of the second TM powder is chosen from cobalt, manganese, nickel, niobium, tin, iron and mixtures thereof. Preferably, the amounts of first and second TM powders are chosen such that the material obtained at the end of the milling step c) has the formula $Li_x(Ti_bM'_{1-b})_yA_z$, M' being chosen from cobalt, manganese, nickel, niobium, tin, iron and mixtures thereof, the coefficient b being such that 0<b<1. Obviously, the coefficients x, y and z are as described previously.

The coefficient b may be greater than 0.1, greater than 0.2, greater than 0.3, greater than 0.4, greater than 0.5, greater than 0.6, greater than 0.7, greater than 0.8, greater than 0.9. The coefficient b may be less than 0.9, less than 0.8, less than 0.7, less than 0.6, less than 0.5, less than 0.4, less than 0.3, less than 0.2, less than 0.1.

Preferably, the chalcogen element of the second powder is selenium.

The median size of the TM powder is preferably less than 100 μm, or even less than 50 μm. The efficiency of the reaction of the chalcogen element with lithium and/or the transition metal during the milling step c) are thus improved.

Preferably, the chalcogen powder includes, for more than 99.0% of its mass, preferably for more than 99.9% of its mass, the chalcogen element. It may consist of the chalcogen element.

Preferably, the chalcogen powder is formed, for more than 90.0% of its mass, preferably more than 95.0% of its mass, preferably for more than 99.0% of its mass, preferably for more than 99.9% of its mass, particles formed from the chalcogen element.

Preferably, the chalcogen element is sulfur or selenium or tellurium.

Preferably, the chalcogen element is sulfur and, preferably, the material obtained at the end of step c) then has the formula $Li_xM_yS_z$. The stoichiometric coefficients x, y and z are as described above.

The median size of the TM powder is preferably less than 100 μm, or even less than 50 μm. The efficiency of the reaction of the chalcogen element with lithium and/or the transition metal during the milling step c) are thus improved.

In one variant, the plurality of powders includes at least two chalcogen powders that are different from each other, which may differ in their particle sizes and or, preferably, in their compositions.

In particular, the plurality of powders may include first and second chalcogen powders that are different from each other, notably at least in their compositions.

Preferably, the chalcogen element of the first chalcogen powder is sulfur and the chalcogen element of the second chalcogen powder is chosen from selenium, tellurium and mixtures thereof. Preferably, the amounts of first and second chalcogen powders are chosen such that the material obtained at the end of the milling step c) has the formula $Li_xM_y(A'_cS_{1-e})_z$, A' being chosen from tellurium, selenium and mixtures thereof, the coefficient c being such that 0<c<1. The stoichiometric coefficients x, y and z are as described above.

The coefficient c may be greater than 0.1, greater than 0.2, greater than 0.3, greater than 0.4, greater than 0.5, greater than 0.6, greater than 0.7, greater than 0.8, greater than 0.9. It may be less than 0.9, less than 0.8, less than 0.7, less than 0.6, less than 0.5, less than 0.4, less than 0.3, less than 0.2, less than 0.1.

As emerges clearly to a person skilled in the art, the embodiments described above of the TM powder(s) and of the chalcogen powder(s) may be combined together.

For example, the plurality of powders includes first and second TM powders and first and second chalcogen powders in amounts such that the material obtained at the end of step c) has the formula $Li_x(Ti_bM'_{1-b})_y(A'_cS_{1-c})_2$. The coefficients x, y, z, b and c are as described above.

As a variant, the chalcogen element of the TM powder is selenium and the transition metal is titanium and the amounts of the powders of the plurality are chosen such that the material obtained at the end of step c) has the formula $Li_xTi_yS_z$.

In a particular embodiment of the process, the TM powder may include, for more than 99.9% of its mass, lithium sulfide particles, the chalcogen powder may include, for more than 99.9% of its mass, sulfur particles, and the TM powder may include, for more than 99.9% of its mass, titanium particles, and the amounts of said powders are determined such that the material obtained at the end of step c) has the formula $Li_2TiS_3$ and is of NaCl crystallographic structure. The material of formula $Li_2TiS_3$ is obtained according to the following reaction scheme:

$$Li_2S + Ti + 2S \rightarrow Li_2TiS_3$$

The lithium ions $Li^+$ of the lithium titanium sulfide obtained via the specific embodiment of the process according to the invention originate from the precursor lithium sulfide $Li_2S$ and the titanium ions $Ti^{4+}$ originate from the titanium precursor Ti and the sulfur ions $S^{2-}$ originate from the precursors lithium sulfide $Li_2S$ and sulfur S.

In another particular embodiment of the process, the TM powder may include, for more than 99.9% of its mass, lithium sulfide particles, the chalcogen powder may include, for more than 99.9% of its mass, sulfur particles, and the TM powder may include, for more than 99.9% of its mass, titanium particles, and the amounts of said powders are determined such that the material obtained at the end of step c) has the formula $Li_3TiS_4$ and is of NaCl crystallographic structure.

In step b), all the powders of the plurality may be mixed to form the particulate mixture. The particulate mixture preferably consists of the powders of the plurality. Notably, the particulate mixture may be prepared prior to the milling. Alternatively, all the powders may be poured consecutively into the milling bowl during milling.

As a variant, the particulate mixture may be prepared by mixing one of the powders of the plurality with the milled material obtained from at least two of the other powders of the plurality. The process may then include a step b') successive to step a) and prior to step b), including the mixing of said other powders to form a particulate assembly, followed by milling of the particulate assembly to form the milled material. The milled material is in particulate form. Preferably, the particulate mixture consists of one of the powders of the plurality and the milled material obtained from at least two of the other powders of the plurality.

The milling of the particulate assembly may be performed with the mill used in step c), preferably in a wet medium in a solvent.

The milling of the particulate assembly may be performed in a solvent.

The solvent in step b') may be chosen from hexane, cyclohexane, heptane and mixtures thereof. Preferably, the solvent in step b') is hexane, preferably with a purity of greater than 99.5%, preferably greater than 99.9%.

Preferably, in step b'), the particulate assembly is dispersed in the solvent.

Preferably, the milling in step b') is performed so that the particles of the milled material are the product of the reaction of the constituents of the powders of the particulate assembly.

The particulate assembly may be formed by mixing the TM powder and the chalcogen powder, or by mixing the TM powder and the lithiated powder, or by mixing the chalcogen powder and the lithiated powder.

In step c), the milling of the particulate mixture may be performed in a wet medium in a solvent.

The solvent in step c) may be chosen from hexane, cyclohexane, a mixture of heptane, acetone and ethanol, and mixtures thereof. Preferably, the solvent in step c) is hexane, preferably with a purity of greater than 99.5%, preferably greater than 99.9%.

The solvents in steps b') and c) may be identical.

Preferably, in step c), the particulate mixture is dispersed in the solvent.

The step of milling the particulate mixture is performed in a mill, for example a planetary ball mill, the spin speed of which may be greater than 500 rpm. However, the invention is not limited to such a type of mill. Any other mill conventionally used in the field of the invention may be used, provided that the milling energy that it is capable of supplying to the particulate mixture is sufficient for the constituents of the particulate mixture to react together.

Preferably, the duration of the milling step c) is between 10 hours and 50 hours, preferably between 15 hours and 25 hours. Moreover, the milling step may be performed at a temperature of between 10° C. and 40° C., for example at room temperature.

In step c), the solvent may be introduced before, together with or after the introduction of the particulate mixture into the mill.

To limit the corrosion of the particulate mixture and of the material being formed, and notably of the transition metal, the step of milling the particulate mixture is preferably performed under a reductive atmosphere or, preferably, a neutral atmosphere, for example under argon.

Preferably, the material obtained by reacting the constituents of the particulate mixture at the end of step c) is in the form of a powder.

The process may moreover include a drying step following the milling step c), so as to remove the solvent.

The material obtained at the end of the milling step c) may at least partially form a battery cathode, notably of a lithium-ion battery.

It preferably has a crystallographic structure of NaCl type. A crystallographic structure "of NaCl type" is a face-centered cubic structure of the $Fm\bar{3}m$ space group.

Moreover, the particles of the material obtained via the process according to the invention are preferably in the form of a powder. The particles of the powder may be of varied shape. For example, the particles are of spherical or platelet shape. The particles may have a size of between 20 nm and 5 μm, notably less than 1 μm. The "size" of a particle is its largest dimension that is observable, for example, on an image taken with a scanning electron microscope, in a direction perpendicular to the plane on which said particle is lying. Moreover, the particles may form aggregates, for example of the order of 30 μm in size.

The material obtained at the end of the milling step c) may preferably have a maximum reversible capacity of greater than 200 mAh·g$^{-1}$, or even greater than 230 mAh·g$^{-1}$, expressed as grams of material according to the invention. The reversible capacity is measured between 1.5 V and 3.0 V vs Li$^+$/Ai in a C/10 regime A C/y regime corresponds to charging performed in y hours.

Moreover, the invention relates to a battery cathode including, or even constituted by, the material obtained via the process according to the invention.

Figure 2:
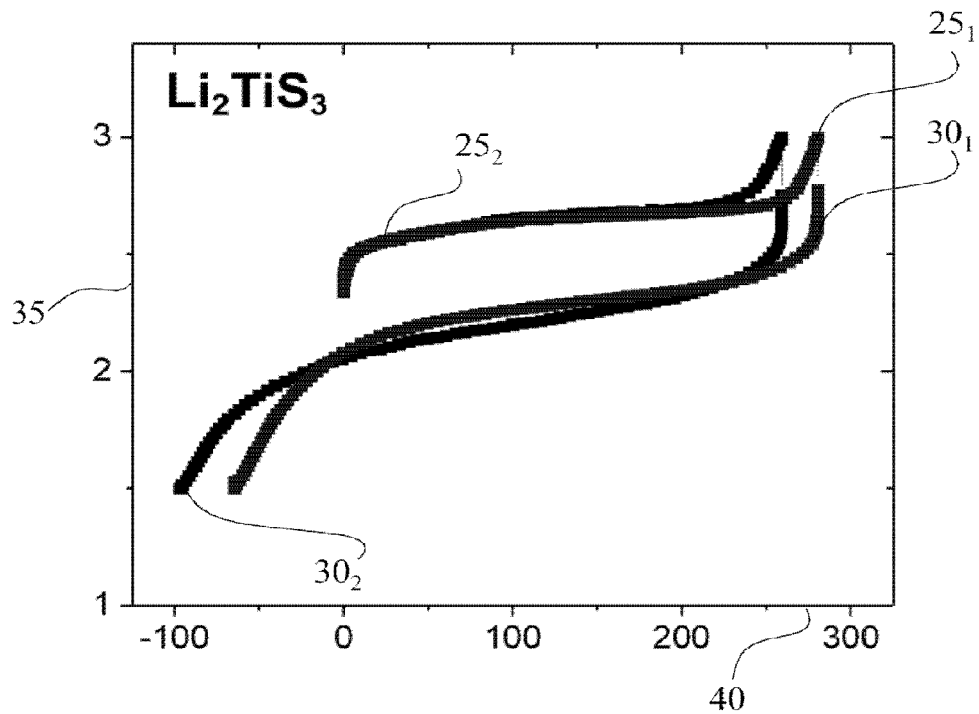

Other advantages of the invention will emerge on reading the examples that follow and by means of the attached drawing, in which:

FIG. 1 contains diffractograms obtained by X-ray diffraction of materials of formula $Li_2TiS_3$ obtained via the process according to the invention and according to the prior art, in which the diffraction intensity, in arbitrary units, is expressed as a function of the diffraction angle 2θ, and FIG. 2 is a graph representing the change in the potential, in V vs Li+/Li, as a function of the capacity, in mAh/g, during the first charging/discharging cycle, of a battery including the material of formula $Li_2TiS_3$ obtained via the process of the prior art and via the process of the invention.

EXAMPLES

The nonlimiting examples that follow are given for the purpose of illustrating the invention.

The following starting materials are used to perform the following examples:
  powder of lithium sulfide $Li_2S$ particles, sold under the reference 213241-10G by the company Sigma Aldrich,
  powder of titanium sulfide $TiS_2$ particles, sold under the reference 333492-10G by the company Sigma Aldrich,
  powder of titanium Ti particles, including by mass at least 99.98% of titanium, the particles having a size of less than 44 µm, sold by the company Sigma Aldrich, and
  powder of sulfur S flakes, including by mass at least 99.99% of sulfur, sold by the company Sigma Aldrich.

Moreover, the X-ray diffraction analysis were performed using a Brüker® brand D8 Advance diffractometer.

Comparative Example 1

0.44 g of lithium sulfide powder and 1.06 g of titanium sulfide powder are placed in a 50 ml zirconia jar containing 285 zirconia beads with a diameter equal to 5 mm. No solvent is added. The jar is then closed by means of a lid and mounted on a Retsch® brand planetary ball mill of reference PM 100. The bowl is filled and emptied in a glovebox filled with argon. Milling is then performed for a time of 20 hours, the spin speed of the mill being set at 510 rpm.

A powder of $Li_2TiS_3$ particles is thus obtained.

A composition including, as mass percentages, 10% of Super P C65 carbon sold by the company Timcal, 10% of polyvinylidene difluoride (PVDF) as binder, and 80% of the $Li_2TiS_3$ particle powder is then prepared in a glovebox under an argon atmosphere. 0.400 ml of N-methyl-2-pyrrolidone (NMP) is added to the composition. The composition is then mixed for 5 minutes at 25° C. An ink is thus obtained. A thickness of 100 µm of the ink is coated using a doctor blade onto an aluminum foil. The ink is dried under an argon atmosphere for 24 hours at 70° C. An electrode is then cut out of the ink-covered aluminum foil which has dried. The electrode is in the form of a pellet 14 mm in diameter. It is pressed under a pressure of 100 kN and finally dried under vacuum at 60° C. for 48 hours.

A battery in the form of a button cell in CR2032 format is manufactured and includes the electrode forming the cathode and a lithium metal (Li) counterelectrode forming the anode, with a diameter of 16 mm. A separator in the form of a pellet 16 mm in diameter, constituted of a Viledon brand membrane of reference FS 2207-2-DA WA and a Celgard 2400 membrane, is placed between the electrode and the counterelectrode. The electrodes, counterelectrode and separator are immersed in a volume of 150 µM of a liquid electrolyte LP100 constituted of a solvent formed, by mass, of one part of ethyl carbonate, one part of propylene carbonate and three parts of dimethyl carbonate, in which is dissolved a lithium hexafluorophosphate ($LiPF_6$) salt at a concentration of 1 mol/l.

The battery is subjected to 1 cycle formed of galvanostatic charging followed by galvanostatic discharging, imposed at 25° C. between a potential of 1.5 V and 3.0 V vs $Li^+/Li$ at a regime of C/10.

The battery cycling system is of Arbin Instruments® brand.

Example 2

0.40 g of lithium sulfide powder, 0.42 g of titanium powder and 0.56 g of sulfur powder are placed in a 50 ml zirconia jar containing 285 zirconia beads with a diameter equal to 5 mm. High-purity hexane (greater than 99.9%) is poured into the jar until the zirconia beads are covered. The jar is then closed by means of a lid and mounted on a Retsch® brand planetary ball mill of reference PM 100. The mill is placed in a glovebox filled with argon. Milling is then performed for a time of 32 hours, the spin speed of the mill being set at 510 rpm.

A powder of $Li_2TiS_3$ particles is thus obtained.

An electrode and a battery are manufactured according to the same procedure as that described in Example 1, replacing the powder of Example 1 with the powder of Example 2.

X-ray diffraction analyses of the $Li_2TiS_3$ powders of Examples 1 and 2 confirm that the constituent materials of these powders have a crystallographic structure of NaCl type, as is confirmed by the respective diffractograms 5 and 10 shown in FIG. 1.

Moreover, diffractograms 15 and 20 of the starting $Li_2S$ and $TiS_2$ powders are shown in FIG. 1. After milling, no trace of $Li_2S$ or of $TiS_2$ is detected for Comparative Example 1 and no trace of $Li_2S$ is detected for Example 2, which means that all the constituents of the particulate mixtures have reacted during the milling to form lithium titanium sulfide.

Moreover, the powders of Comparative Example 1 and of Comparative Example 2 both have a crystallographic structure of NaCl type, as is illustrated by their respective diffractograms 5 and 10.

FIG. 2 represents the change during the first cycle of charging $25_{1-2}$ and discharging $30_{1-2}$ of the potential 35 of the positive electrode including the materials of Examples 1 and 2, respectively, as a function of the specific capacity 40 of the material. Curves $25_1$, $30_1$ correspond to Comparative Example 1 and curves $25_2$, $30_2$ correspond to Example 2 according to the invention.

Needless to say, the invention is not limited to the embodiments of the product and to the implementations of the process presented in the present description.

Moreover, unless otherwise indicated, an inequality of the type "A less than B", also worded as "A<B", is strictly considered. This is likewise the case for an inequality of the type "A greater than B", also worded as "A>B". In other words, the equality between A and B is excluded.

The invention claimed is:

1. A process for synthesizing a material, the process consisting of:
  a) providing a plurality of powders comprising:
    at least one lithiated powder including lithium,
    at least one TM powder including, for more than 95.0% of its mass, a transition metal chosen from titanium, cobalt, manganese, nickel, niobium, tin, iron and mixtures thereof, and
    at least one chalcogen powder including, for more than 95.0% of its mass, a chalcogen element chosen from sulfur, selenium, tellurium and mixtures thereof;
  b) preparing a particulate mixture by mixing all the powders of the plurality or by mixing one of the powders of the plurality with a milled material obtained by milling a particulate assembly formed by mixing at least two of the other powders of the plurality; and
  c) milling the particulate mixture to form the material, the material obtained at the end of the milling c) having a crystallographic structure of NaCl type.

2. The process according to claim 1, wherein the amounts of lithiated powder, of TM powder and of chalcogen powder are determined so that, at the end of the milling c), the material has the formula (I):

$$Li_xM_yA_z \quad (I),$$

with M being a transition metal chosen from titanium, manganese, cobalt, nickel, niobium, tin, iron and mixtures thereof, A being a chalcogen element chosen from sulfur, tenllurium, selenium, and mixtures thereof, the stoichiometric coefficients x, y and z being such that
$1.0 < x < 4.0$;
$0 < y \leq 2.0$; and
$1.0 \leq z \leq 4.0$.

3. The process according to claim 1, wherein the lithiated powder has less than 90% of its mass, of a chalcogen element.

4. The process according to claim 1, wherein the transition metal is titanium, manganese, cobalt, nickel, niobium, tin or iron.

5. The process according to claim 1, wherein the plurality of powders includes first and second TM powders that are different from each other.

6. The process according to claim 2, wherein the transition metal of the first TM powder is titanium and the transition metal of the second TM powder is chosen from cobalt, manganese, nickel, niobium, tin, iron and mixtures thereof.

7. The process according to claim 6, wherein the amounts of first and second TM powders are chosen such that the material obtained at the end of the milling c) has the formula $Li_x(Ti_bM'_{1-b})_yA_z$, M' being chosen from cobalt, manganese, nickel, niobium, tin, iron and mixtures thereof, the coefficient b being such that $0 < b \ 1$.

8. The process according to claim 1, wherein the chalcogen element is sulfur or selenium or tellurium.

9. The process according to claim 2, wherein the plurality of powders includes first and second chalcogen powders that are different from each other.

10. The process according to claim 9, wherein the chalcogen element of the first chalcogen powder is sulfur and the chalcogen element of the second chalcogen powder is chosen from selenium, tellurium and mixtures thereof.

11. The process according to claim 10, wherein the amounts of first and second chalcogen powders are chosen such that the material obtained at the end of the milling c) has the formula $Li_xM_y(A'_cS_{1-c})_z$, A' being chosen from tellurium, selenium and mixtures thereof, the coefficient c being such that $0 < c < 1$.

12. The process according to claim 2, wherein
$1.9 < x < 3.1$, and/or
$0.9 < y \leq 1.1$, and/or
$2.0 \leq z \leq 3.5$.

13. The process according to claim 1, wherein the lithiated powder includes, for more than 99.9% of its mass, lithium sulfide particles, the chalcogen powder includes, for more than 99.9% of its mass, sulfur particles, and the TM powder includes, for more than 99.9% of its mass, titanium particles, and the amounts of said powders are determined such that the material obtained at the end of the milling c) has the formula $Li_2TiS_3$.

14. The process according to claim 1, wherein, in the milling c), the milling of the particulate mixture is performed in a wet medium in a solvent.

15. The process according to claim 14, wherein, in the milling c), the solvent used is chosen from hexane, cyclohexane, heptane, acetone, ethanol and mixtures thereof.

16. The process according to claim 15, wherein, in the milling c), the solvent used is a mixture made of heptane, acetone, and ethanol.

* * * * *